United States Patent
Rusta-Sallehy et al.

(10) Patent No.: US 7,353,085 B2
(45) Date of Patent: Apr. 1, 2008

(54) ELECTROLYZER CELL STACK SYSTEM

(75) Inventors: Ali Rusta-Sallehy, Richmond Hill (CA); Michael Vale, Brampton (CA)

(73) Assignee: Hydrogenics Corporation, Mississauga (CA)

( * ) Notice: Subject to any disclaimer, the term of this patent is extended or adjusted under 35 U.S.C. 154(b) by 396 days.

(21) Appl. No.: 10/944,878

(22) Filed: Sep. 21, 2004
(Under 37 CFR 1.47)

(65) Prior Publication Data
US 2005/0197743 A1 Sep. 8, 2005

Related U.S. Application Data

(60) Provisional application No. 60/504,218, filed on Sep. 22, 2003.

(51) Int. Cl.
*G05D 23/00* (2006.01)
(52) U.S. Cl. ..................... 700/299; 700/300
(58) Field of Classification Search ............... 700/299, 700/300; 204/228.6; 429/22–24
See application file for complete search history.

(56) References Cited

U.S. PATENT DOCUMENTS

| | | | |
|---|---|---|---|
| 3,595,699 A * | 7/1971 | Baude | 429/24 |
| 3,801,374 A | 4/1974 | Dews et al. | |
| 4,214,969 A | 7/1980 | Lawrence | |
| 4,988,583 A | 1/1991 | Watkins et al. | |
| 5,252,410 A | 10/1993 | Wilkinson et al. | |
| 5,419,980 A | 5/1995 | Okamoto et al. | |
| 5,566,001 A | 10/1996 | Saidi et al. | |
| 5,578,388 A | 11/1996 | Faita et al. | |
| 5,606,242 A | 2/1997 | Hull et al. | |
| 5,690,797 A | 11/1997 | Harada et al. | |
| 5,750,281 A | 5/1998 | Washington et al. | |
| 5,763,113 A | 6/1998 | Meltser et al. | |

(Continued)

FOREIGN PATENT DOCUMENTS

CA 2053278 1/1990

(Continued)

OTHER PUBLICATIONS

Grubb, W.T., and Niedrach, L.W., Batteries with Solid Ion-Exchange Membrane Electrolytes, II: Low Temperature Hydrogen Oxygen Fuel Cells, Journal of the Electrochemical Society, Feb. 1960, 107, pp. 131-135.

(Continued)

*Primary Examiner*—Leo Picard
*Assistant Examiner*—Steven R. Garland
(74) *Attorney, Agent, or Firm*—Bereskin & Parr

(57) ABSTRACT

As an electrochemical cell stack gets older the internal resistances within the stack rise overtime as the materials that the stack is made of degrade. Consequently, an old and "worn" electrochemical cell stack draws less current at the same stack voltage and operating temperature as a new stack. When the current draw falls the electrochemical reaction rates also fall, as less energy is available to drive the electrochemical reactions. However, if the operating temperature of an older stack is controllable raised the current draw by an electrolyzer cell stack also rises, which in turn causes the reaction rates to rise again. Accordingly, in some embodiments, a balance-of-plant system is operable to regulate the current draw of an electrolyzer cell stack by first manipulating the operating temperature of the same electrolyzer cell stack.

23 Claims, 4 Drawing Sheets

U.S. PATENT DOCUMENTS

| | | |
|---|---|---|
| 5,789,094 A | 8/1998 | Kusunoki et al. |
| 5,977,249 A | 11/1999 | Kovar et al. |
| 5,981,098 A | 11/1999 | Vitale |
| 6,007,933 A | 12/1999 | Jones |
| 6,017,648 A | 1/2000 | Jones |
| 6,066,409 A | 5/2000 | Ronne et al. |
| 6,080,503 A | 6/2000 | Schmid et al. |
| 6,099,984 A | 8/2000 | Rock |
| 6,174,616 B1 | 1/2001 | Marvin et al. |
| 6,207,312 B1 | 3/2001 | Wynne et al. |
| 6,255,011 B1 | 7/2001 | Fujii et al. |
| 6,261,711 B1 | 7/2001 | Matlock et al. |
| 6,309,773 B1 | 10/2001 | Rock |
| 6,410,179 B1 | 6/2002 | Boyer et al. |
| 6,451,464 B1 | 9/2002 | Edlund et al. |
| 6,500,580 B1 | 12/2002 | Marvin et al. |
| 6,566,001 B2 | 5/2003 | Yosida et al. |
| 6,619,054 B1 | 9/2003 | Cargnelli et al. |
| 6,673,480 B1 | 1/2004 | Wilkinson et al. |
| 6,887,606 B2 * | 5/2005 | Parr et al. ............... 429/22 |
| 2002/0020623 A1 | 2/2002 | Speranza et al. |
| 2002/0172852 A1 | 11/2002 | Frank et al. |
| 2003/0031914 A1* | 2/2003 | Frank et al. ............ 429/35 |
| 2003/0118882 A1 | 6/2003 | Voss |
| 2003/0186106 A1* | 10/2003 | Frank et al. ............ 429/38 |
| 2004/0146755 A1 | 7/2004 | Meredith et al. |
| 2004/0185316 A1* | 9/2004 | Wells et al. ............. 429/22 |
| 2005/0112426 A1* | 5/2005 | Toth et al. .............. 429/22 |

FOREIGN PATENT DOCUMENTS

| | | |
|---|---|---|
| CA | 2460241 | 3/2003 |
| DE | 10126723 A1 | 12/2002 |
| EP | 0425939 A1 | 5/1991 |
| EP | 0834947 | 4/1998 |
| EP | 1156546 | 7/1998 |
| EP | 1009052 | 6/2000 |
| EP | 1083616 | 3/2001 |
| EP | 1263068 | 12/2004 |
| JP | 61-227368 | 10/1986 |
| JP | 05-109415 | 4/1993 |
| JP | 07-240218 | 9/1995 |
| JP | 07-263003 | 10/1995 |
| JP | 2001338673 | 12/2001 |
| WO | WO 99/04446 | 1/1999 |
| WO | WO 00/24066 | 4/2000 |
| WO | WO 02/093672 | 11/2002 |

OTHER PUBLICATIONS

Hoogers, G., "Fuel Cell Technology Handbook", CRC Press LLC, Boca Raton Florida, 2003, ISBN: 0-8493-0877-1, pp. 4.1-4.27.

* cited by examiner

ELECTROLYZER CELL STACK SYSTEM

PRIORITY CLAIM

This application claims the benefit, under 35 USC 119(e), of U.S. Provisional Application No. 60/504,218 that was filed on Sep. 22, 2003, and the entire contents of which is hereby incorporated by reference.

FIELD OF THE INVENTION

The invention relates to electrolyzer cells and, in particular to a balance-of-plant system and apparatus suited for regulating the operation of an electrolyzer cell stack.

BACKGROUND OF THE INVENTION

An electrolyzer cell is a type of electrochemical device that uses energy to dissociate a compound liquid into its components. For example, water can be dissociated into hydrogen and oxygen (e.g. $H_2O \rightarrow H_2+O_2$).

In practice, a number of electrolyzer cells are arranged into a stack to produce sizable amounts of one or more of the components of a compound liquid. To this end, the electrolyzer cell stack is included in a module that includes a suitable combination of supporting elements, collectively termed a balance-of-plant system, which is specifically configured to maintain operating parameters and functions for the electrolyzer cell stack. Example functions of a balance-of-plant system include the maintenance and regulation of various pressures, temperatures and flow rates.

In particular, a typical balance-of-plant system is configured to maintain an operating temperature of an electrolyzer cell stack at a constant value in order to optimize reaction rates. For example, Proton Exchange Membrane (PERM) electrolyzer cells are typically operated at 65° C., the temperature at which the rate of electrolysis reactions for this type of electrolyzer cell are optimized for a particular voltage supply and expected current draw.

SUMMARY OF THE INVENTION

According to an aspect of an embodiment of the invention there is provided a balance-of-plant system, suited for regulating the operating temperature of an electrochemical cell stack having at least one electrochemical cell, including: a controller having a computer program readable code means for changing the operating temperature of the electrochemical cell stack as a result of a current draw measurement, the computer program readable code means including: instructions for monitoring the operating temperature; instructions for monitoring the current draw associated with the electrochemical cell stack; and, instructions for changing the operating temperature of the electrochemical cell stack as a result of the current draw measurement.

In some embodiments the instructions for changing the operating temperature of the electrochemical cell stack as a result of the current draw measurement also include: instructions for determining whether or not the current operating temperature is above a first threshold; and, instructions for initiating an emergency shut-down procedure if the current operating temperature is above the first threshold.

In some embodiments the instructions for changing the operating temperature of the electrochemical cell stack as a result of the current draw measurement further comprises: instructions for determining whether or not the current operating temperature is above a first threshold; instructions for providing a warning signal if the current operating temperature is above the first threshold; and, instructions for raising the operating temperature by a pre-set amount if the current operating temperature is below the first threshold. In some related embodiments, the instructions for raising the temperature include instructions for signaling balance-of-plant elements to increase the temperature by the pre-set amount. In other related embodiments the instructions for changing the operating temperature of the electrochemical cell stack as a result of the current draw measurement further includes instructions for lowering the operating temperature if the current operating temperature is above the first threshold. In some embodiments the instructions for lowering the temperature include instructions for signaling balance-of-plant elements to decrease the temperature.

In some embodiments the instructions for changing the operating temperature of the electrochemical cell stack as a result of the current draw measurement also include: instructions for determining whether or not the current operating temperature is above a second threshold; and, instructions for initiating an emergency shut-down procedure if the current operating temperature is above the second threshold.

In some embodiments the computer program readable code means also includes: instructions for determining whether or not the current draw is above a first threshold; and, instructions for lowering the operating temperature if the current draw is above the first threshold.

In some embodiments the computer program readable code means also includes: instructions for determining whether or not the current draw is below a first threshold; and, instructions for raising the operating temperature if the current draw is below the first threshold. In some related embodiments the computer program readable code means also includes: instructions for determining whether or not the current draw is above a second threshold; and, instructions for lowering the operating temperature if the current draw is above the second threshold. In other related embodiments, the computer program readable code means also includes: instructions for determining whether or not the operating temperature is above a second threshold; and, instructions for providing a warning signal if the current operating temperature is above the second threshold; and, instructions for raising the operating temperature by a pre-set amount if the current operating temperature is below the second threshold.

In some embodiments the instructions for changing the operating temperature of the electrochemical cell stack as a result of the current draw measurement also includes: instructions for determining whether or not the current operating temperature is above a third threshold; and, instructions for initiating an emergency shut-down procedure if the current operating temperature is above the third threshold.

According to an aspect of an embodiment of the invention there is provided an electrochemical cell stack module comprising a controller for changing the operating temperature of the electrochemical cell stack as the stack ages to compensate for degradation of the components of the electrochemical cell stack, wherein as the current draw decreases for a fixed voltage, the operating temperature increases, and the controller has instructions for: determining by how much a current draw has decreased below a first level as a result of component degradation; calculating a temperature increase that will increase the current draw back to the first level; and, signaling balance-of-plant elements to increase the temperature as calculated.

According to an aspect of an embodiment of the invention there is provided a method of regulating the operating temperature of an electrochemical cell stack having at least one electrochemical cell, including: monitoring the operating temperature; monitoring the current draw associated with the electrochemical cell stack; and, changing the operating temperature of the electrochemical cell stack as a result of current draw measurements.

In some embodiments the method also includes: determining whether or not the current operating temperature is above a first threshold; providing a warning signal if the current operating temperature is above the first threshold; and, raising the operating temperature by a pre-set amount if the current operating temperature is below the first threshold. In some related embodiments determining whether or not the current operating temperature is above a second threshold; and, initiating an emergency shut-down procedure if the current operating temperature is above the second threshold.

Other aspects and features of the present invention will become apparent, to those ordinarily skilled in the art, upon review of the following description of the specific embodiments of the invention.

BRIEF DESCRIPTION OF THE DRAWINGS

For a better understanding of the present invention, and to show more clearly how it may be carried into effect, reference will now be made, by way of example, to the accompanying drawings that illustrate aspects of embodiments of the present invention and in which.

DETAILED DESCRIPTION OF THE INVENTION

Some embodiments of the present invention provide a balance-of-plant system suited for regulating the operation of an electrolyzer cell stack. Specifically, in some embodiments, a balance-of-plant system is operable to regulate the current draw of an electrolyzer cell stack by first manipulating the operating temperature of the same electrolyzer cell stack. Examples are provided below to demonstrate how the operating temperature can be regulated to thereby regulate the reaction rates within an electrolyzer cell stack by first affecting its current draw.

As an electrochemical cell stack gets older the internal resistances within the stack rise overtime as the materials degrade. Consequently, an old and "worn" electrochemical cell stack draws less current at the same stack voltage and operating temperature as a new stack. When the current draw falls the electrochemical reaction rates also fall, as less energy is available to drive the electrochemical reactions. However, if the operating temperature of an older stack is controllable raised the current draw by an electrolyzer cell stack also rises, which in turn causes the reaction rates to rise again. The operating temperature can be raised by only so much before the higher heat levels damage the electrochemical cell stack and supporting systems. Accordingly, one or more temperature thresholds are useful in maintaining the temperature of the electrochemical cell stack below heat levels that may cause damage.

There are a number of different electrochemical cell technologies and, in general, this invention is expected to be applicable to all types of electrochemical cells. Very specific example embodiments of the invention have been developed for use with Proton Exchange Membrane (PERM) electrolyzer cells. Various other types of electrolyzer cells also include, without limitation, Solid Polymer Water Electrolytes (SPEW). Similarly, various types of fuel cells include, without limitation, Alkaline Fuel Cells (AC), Direct Methanol Fuel Cells (DMF), Molten Carbonate Fuel Cells (MCFC), Phosphoric Acid Fuel Cells (PAFC), Solid Oxide Fuel Cells (SOFC) and Regenerative Fuel Cells (RFC).

Figure 1:
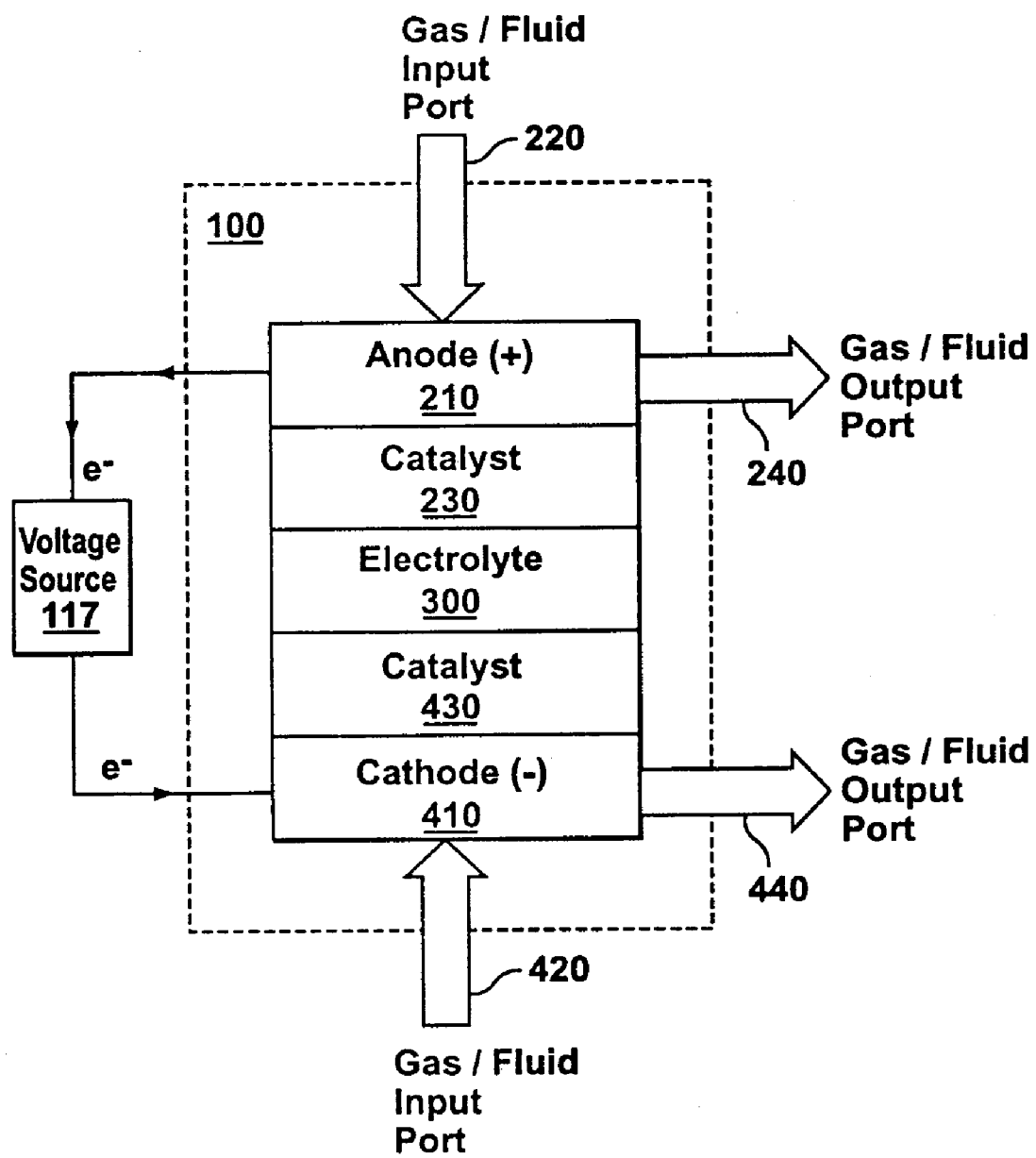
FIG. 1 is a simplified schematic drawing of an electrolyzer cell.

Referring to FIG. 1, shown is a simplified schematic diagram of a Proton Exchange Membrane (PERM) electrolyzer cell, simply referred to as electrolyzer cell 100 hereinafter, that is described herein to illustrate some general considerations relating to the operation of electrochemical cells. It is to be understood that the present invention is applicable to various configurations of electrochemical cell modules that each includes one or more electrochemical cells.

The electrolyzer cell 100 includes an anode electrode 210 and a cathode electrode 410. The anode electrode 210 includes a water input port 220 and a water/oxygen output port 240. Similarly, the cathode electrode 410 includes a water input port 420 and a water/hydrogen output port 440. An electrolyte membrane 300 is arranged between the anode electrode 210 and the cathode electrode 410.

The electrolyzer cell 100 also includes a first catalyst layer 230 arranged between the anode electrode 210 and the electrolyte membrane 300, and a second catalyst layer 430 arranged between the cathode electrode 410 and the electrolyte membrane 300.

In order to energize the electrolyzer cell 100, a voltage source 117 is coupled between the anode and cathode electrodes 210, 410.

In operation, water is introduced into the anode electrode 210 via the water input port 220. The water is dissociated electrochemically according to reaction (1), given below, in the presence of the electrolyte membrane 300 and the first catalyst layer 230.

$$H_2O \rightarrow 2H^+ + 2e^- + \tfrac{1}{2}O_2 \qquad (1)$$

The chemical products of reaction (1) are hydrogen ions (i.e. cations), electrons and oxygen. The hydrogen ions pass through the electrolyte membrane 300 to the cathode electrode 410 while the electrons are drawn through the voltage source 117. Water containing dissolved oxygen molecules is drawn out through the water/oxygen output port 240.

Simultaneously, additional water is introduced into the cathode electrode 410 via the water input port 420 in order to provide moisture to the cathode side of the membrane 300.

The hydrogen ions (i.e. protons) are electrochemically reduced to hydrogen molecules according to reaction (2), given below, in the presence of the electrolyte membrane 300 and the second catalyst layer 430. That is, the electrons and the ionized hydrogen atoms, produced by reaction (1) in the anode electrode 210, are electrochemically consumed in reaction (2) in the cathode electrode 410.

$$2H_2^+ + 2e^- \rightarrow H_2 \qquad (2)$$

The water containing dissolved hydrogen molecules is drawn out through the water/hydrogen output port 440. The electrochemical reactions (1) and (2) are complementary to one another and show that for each oxygen molecule ($O_2$) that is electrochemically produced two hydrogen molecules ($H_2$) are electrochemically produced.

Although only one electrolyzer cell is illustrated in FIG. 1, it is commonly understood that in practice a number of electrochemical cells, all of one type, can be arranged in stacks having common elements, such as process gas/fluid feeds, drainage, electrical connections and regulation devices. That is, an electrochemical cell module is typically made up of a number of singular electrochemical cells connected in series to form an electrochemical cell stack. The electrochemical cell module also includes a suitable combination of structural elements, mechanical systems, hardware, firmware and software that is employed to support the function and operation of the electrochemical cell stack. Such items include, without limitation, piping, sensors, regulators, current collectors, seals, insulators, actuators, switches and electromechanical controllers.

Figure 2:
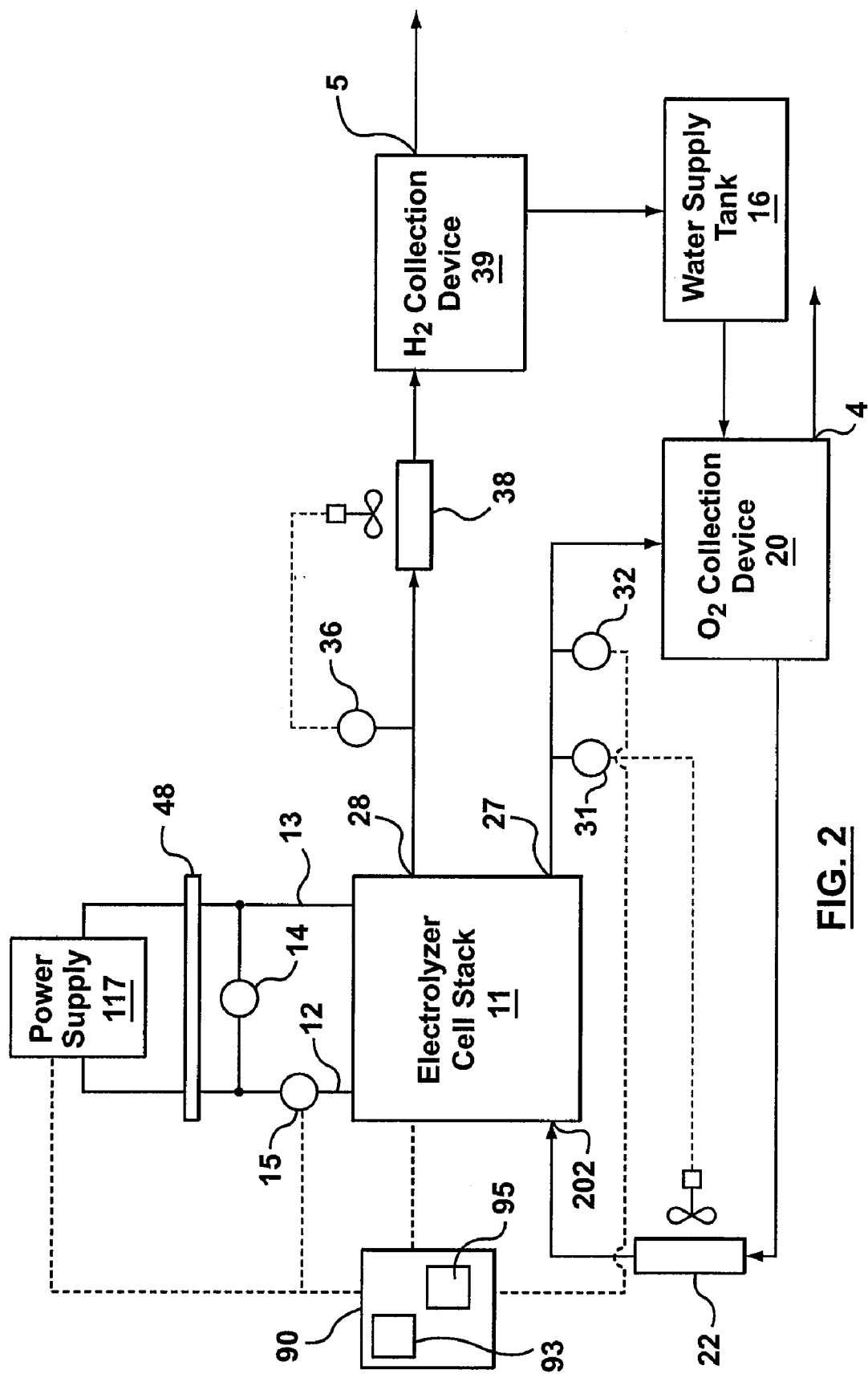
FIG. 2 is a simplified schematic drawing of an electrolyzer cell module according to aspects of an embodiment of the invention.

Referring now to FIG. 2, illustrated is a simplified schematic diagram illustrating an electrolyzer cell module 10 that is configured to dissociate water ($H_2O$) into hydrogen ($H_2$) and oxygen ($O_2$). The electrolyzer cell module 10 includes an electrolyzer cell stack 11, a power supply 117, a hydrogen collection device 39, an oxygen collection device 20, a water supply tank 16 and a suitable combination of balance-of-plant elements.

Those skilled in the art will appreciate that shown in FIG. 2 are only those balance-of-plant elements necessary to describe aspects of this example embodiment of the invention. The balance-of-plant elements can be roughly divided into two groups. A first group may be defined as a suitable combination of supporting apparatus and electromechanical systems that includes, without limitation, elements such as heaters, filters, pumps, humidifiers, valves, and the like. A second group may be defined as a suitable combination of control and sensor systems that includes, without limitation, sensors, switches, valves, hardware, software, firmware and the like.

In some embodiments, the control and sensor systems include a centralized control system (not shown) including for example a microcontroller and/or a computer program readable code means for monitoring and regulating the operation of an electrolyzer cell module, including portions of the supporting apparatus and electromechanical systems. In alternative embodiments, distributed control systems/controllers are provided along with or in place of a centralized control system. Generally, the sensors and the switches are electronically coupled to the aforementioned centralized and/or distributed control systems, which process sensor readings and signal the switches and other electromechanical devices accordingly in order to regulate and in some cases shut down an electrolyzer cell module.

With specific reference to FIG. 2, the electrolyzer cell module 10 includes a controller 90 that is used to manage the operations of the electrolyzer cell module 10. Although the controller 90 is specifically shown to be connected to a number of elements included in the electrolyzer cell module 10 of FIG. 2, those skilled in the art will appreciate that a controller can be connected to any suitable combination of elements included in an electrolyzer cell module. Moreover, as also shown in FIG. 2, the controller 90 includes a modified safety system 93 and at least one application program 95 used to manage the normal operations of the electrolyzer cell module 10. Specifically, in the present embodiment of the invention the controller 90 includes memory storing a computer program readable code means having instructions for the modified safety system 93 and the at least one application program 95.

The electrolyzer cell stack 11 includes one or more PERM electrolyzer cells (not shown). Each PERM electrolyzer cell includes an electrolyte membrane arranged between an anode electrode and a cathode electrode as schematically illustrated in FIG. 1. The electrolyzer cell stack 11 has a cathode outlet port 28, an anode inlet port 202 and an anode outlet port 27. The cathode outlet port 28 is fluidly connected to each of the respective cathode electrodes included in the electrolyzer cell stack 11. Similarly, the anode inlet and outlet ports 202, 27 are fluidly connected to each of the respective anode electrodes included in the electrolyzer cell stack 11. The electrolyzer cell stack 11 also includes respective electrical connections 12, 13 to the anode and cathode terminals of the electrolyzer cell stack 11.

The power supply 117 is coupled across the electrical connections 12, 13 of the electrolyzer cell stack 11. In some embodiments, the power supply 117 is, without limitation, one of a voltage source and a current source.

A stack disconnect device 48 is coupled between the electrolyzer cell stack 11 and the power supply 117. Additionally, a current 15 and a voltage sensor 14 are appropriately arranged between the stack disconnect device 48 and the power supply 117 to measure the current drawn by the electrolyzer cell stack 11 and the voltage across the electrical connections 12, 13.

The stack disconnect device 48 is operable between two states. In a first state, the stack disconnect device 48 electrically couples the power supply 117 to the electrolyzer cell stack 11. In a second state, the stack disconnect device 48 electrically isolates the power supply from the electrolyzer cell stack 11. In some embodiments, switching the stack disconnect device 48 between the two states is, for example, controlled by a central and/or local distributed control system, which may use readings from the current and voltage sensors 15, 14.

The hydrogen collection device 39 includes an output port 5; another output port and an input port. In some embodiments, the output port 5 serves as a tap for hydrogen collected by the hydrogen collection device 39, and is also connectable to other downstream components (not shown). The input of the hydrogen collection device 39 is coupled to the cathode outlet port 28 to accept a combination of water and hydrogen from the electrolyzer cell stack 11. The other output port is coupled to the water supply tank 16 to return water separated from hydrogen during operation.

A first temperature sensor 36 and a first heat exchanger 38 are arranged along the fluid pathway from the cathode outlet port 28 to the hydrogen collection device 39. The first temperature sensor 36 is coupled to provide the first heat exchanger 38 with a regulation signal. Using the regulation signal from the first temperature sensor 36, the first heat exchanger 38 is operable to cool the stream of hydrogen and water exiting the cathode outlet port 28, thereby initiating condensation of the water to separate it from the hydrogen within the hydrogen collection device 39.

The oxygen collection device 20 includes an output port 4; another output port and two input ports. In some embodiments, the output port 4 serves as a tap for oxygen collected by the oxygen collection device 20, and is also connectable to other downstream components (not shown). The other output port is coupled to provide water to the anode inlet port 202, and one of the input ports is coupled to receive a combination of water and oxygen from the anode outlet port 27. The other input port is coupled to receive water from the water supply tank 16. That is, according to this specific example, water is provided to the electrolyzer cell stack 11 from the water supply tank 16 via the oxygen collection device 20, which also recycles water received back from the electrolyzer cell stack 11.

A second temperature sensor 31 and a temperature safety switch 32 are arranged along the fluid pathway from the anode outlet port 27 to the oxygen collection device 20. The first temperature safety switch 32 is operable to send an alarm signal to a centralized and/or distributed control system if the temperature of the stream of oxygen and water exiting the anode outlet port 27 reaches a predetermined high value. In some embodiments, the first temperature safety switch 32 is configured to override and halt the operation of the electrolyzer cell module 10 in the event that the temperature is too high, which may imply that there is a severe problem with the electrolyzer cell module 10.

A second heat exchanger 22 is arranged along the fluid pathway to the anode inlet port 202 from the oxygen collection device 20. The second heat exchanger 22 is also coupled to receive a regulation signal from the second temperature sensor 31 arranged on the fluid pathway originating from the anode outlet port 27. Using the regulation signal from the second temperature sensor 31, the second heat exchanger 22 is operable to adjust the temperature of the water stream entering the electrolyzer cell stack 11.

Optionally, in other embodiments, the water supply tank 16 is also coupled to a cathode inlet port of the electrolyzer cell stack 11 to hydrate the respective cathode sides of the membranes included in the electrolyzer cell stack 11.

In some embodiments, the hydrogen and oxygen collection devices 39, 20 each include a condenser, such as, for example, the apparatus described in the applicant's issued U.S. Pat. No. 6,619,054, which is hereby incorporated by reference.

In some embodiments, the hydrogen collection device 39 has a volume that is about twice the volume of the oxygen collection device 20. This difference in size accommodates the relative rates of hydrogen and oxygen evolution that will occur according to reactions (1) and (2) described above.

In different embodiments the first and second heat exchangers 38, 22 are made up of different components. For example, in one embodiment the first and second heat exchangers 38, 22 include fans for temperature regulation by air-cooling, whereas in other embodiments the first and second heat exchangers 38, 22 include pumps and coolant fluids for temperature regulation by liquid-cooling. Those skilled in the art will generally appreciate that a heat exchanger can be embodied in a number of different forms, but in each embodiment the function of a heat exchanger is to serve as a temperature regulation means.

The operation of the electrolyzer cell module 11 (in FIG. 2) is similar to that of the electrolyzer cell 100 (in FIG. 1). To briefly reiterate, the power supply 117 supplies the requisite energy for reactions (1) and (2). Oxygen is produced in the anode electrodes according to reaction (1) and then a combination of water and oxygen flows out of the anode outlet port 27 into the oxygen collection device 20 where the oxygen is separated from the water. Hydrogen is produced in the cathode electrodes according to reaction (2) and then a combination of water and hydrogen flows out of the cathode outlet port 28 into the hydrogen collection device 39 where the hydrogen is separated from the water.

Figure 3:
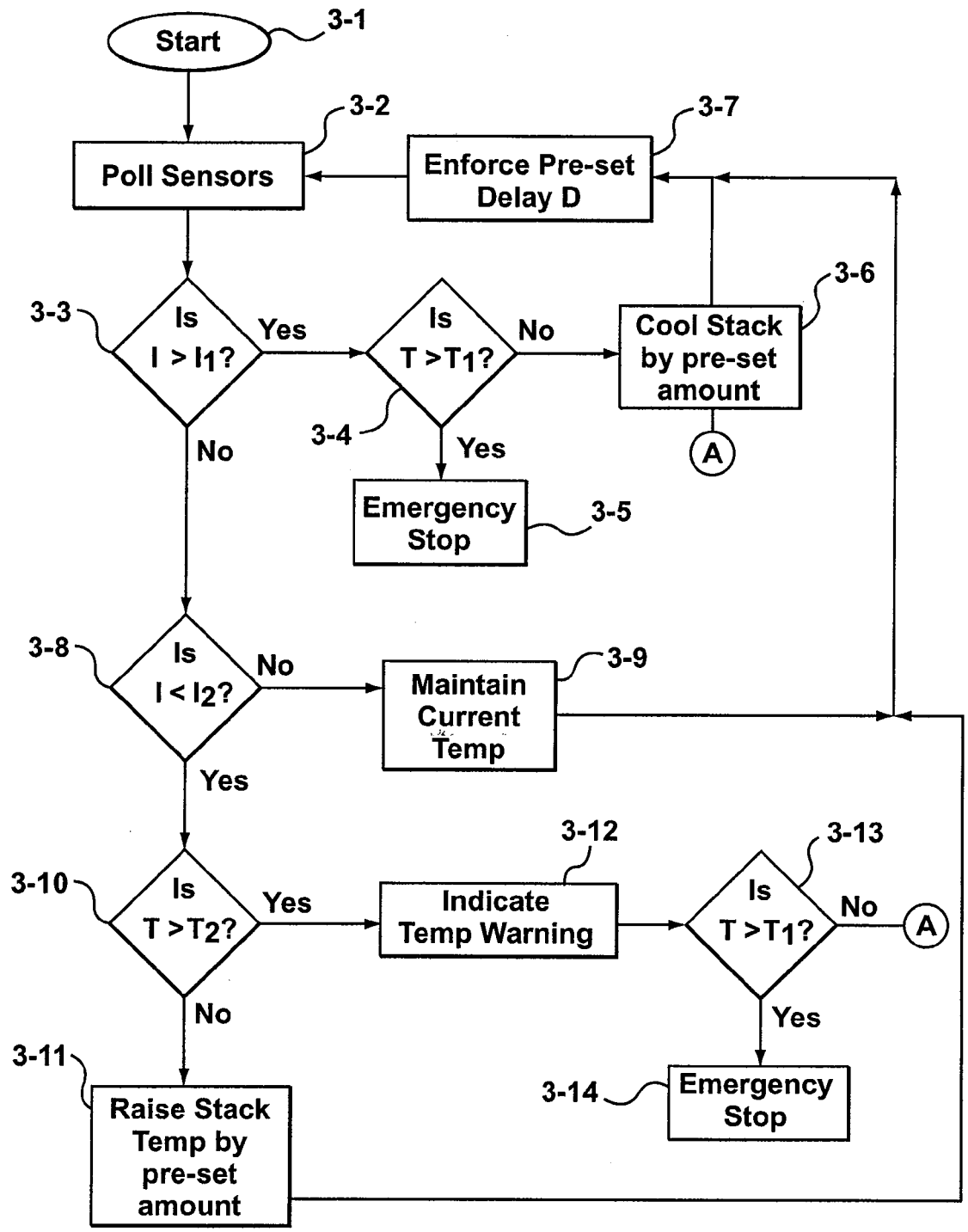
FIG. 3 is a first flow chart illustrating a method of temperature and current regulation according to aspects of an embodiment of the invention.
Figure 4:
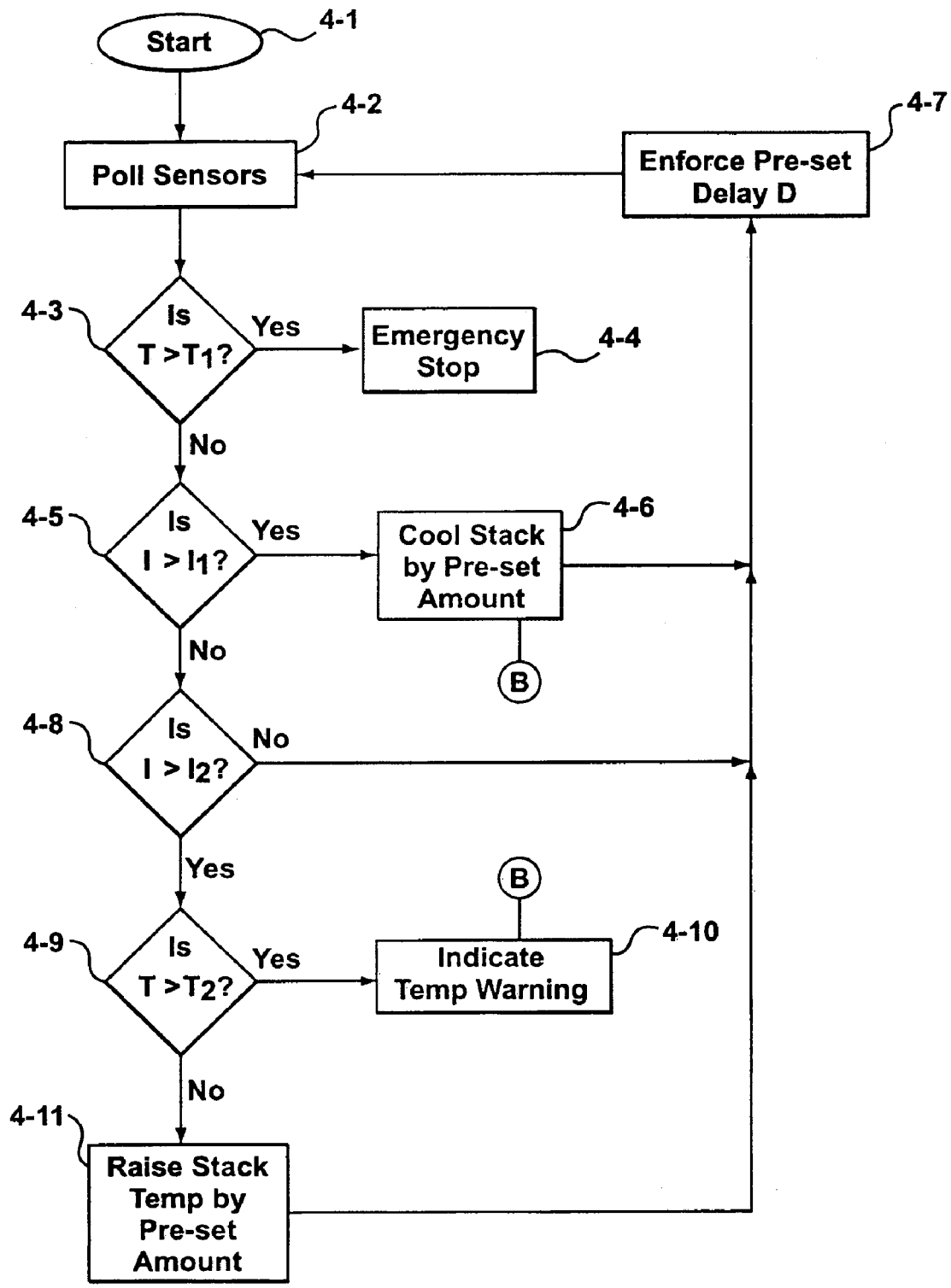
FIG. 4 is a second flow chart illustrating another method of temperature and current regulation according to aspects of an alternative embodiment of the invention.

The operation of the first and second temperature sensors 36, 31, the first and second heat exchangers 38, 22 and the temperature safety switch 32 are described below with respect to the flow charts provided in FIG. 3 and 4. The flow charts provided in FIGS. 3 and 4 illustrate two very specific example methods of temperature and current regulation according to aspects of embodiments of the invention. In some embodiments a control system is provided with a computer program readable code means that has instructions that mirror the method steps described below. Moreover, those skilled in the art will appreciate that these methods may be modified without departing from the scope of the inventive aspects specifically described herein.

Referring now to FIG. 3, a first example method starts at step 3-1, after which sensors (e.g. current sensor 15, voltage sensor 14 and first and second temperature sensors 36, 31) are polled at step 3-2.

At step 3-3, it is determined whether or not the current drawn by the electrolyzer cell stack is above a first current threshold $I_1$. In some embodiments, comparing the current draw to the first current threshold $I_1$ (as is done here at step 3-3) is done to determine whether or not the current draw is at an undesired high level at which damage to parts of the electrolyzer cell module may occur. If the current drawn is below the first current threshold $I_1$ (no path, step 3-30), then the method proceeds to step 3-8. On the other hand, if the current drawn is above the first current threshold $I_1$ (yes path, step 3-3), then the method proceeds to step 3-4.

At step 3-4, it is determined whether or not the temperature of the electrolyzer cell stack is above a first temperature threshold $T_1$. In some embodiments, comparing the temperature of the electrolyzer cell stack to the first temperature threshold $T_1$ (as is done here at step 3-4) is done to determine whether or not the temperature is at an undesired high level at which damage to parts the electrolyzer cell module may occur. If the temperature is above the first temperature threshold $T_1$ (yes path, step 3-4) then the method proceeds to step 3-5 in which an emergency stop procedure for the electrolyzer cell module is initiated. An example of an emergency stop procedure is described in the applicant's co-pending U.S. patent application Ser. No. 10/944,868 filed Sep. 21, 2004, which was incorporated by reference above. On the other hand, if the temperature is below the first temperature threshold $T_1$ (no path, step 3-4), then the method proceeds to step 3-6. At step 3-6, the electrolyzer cell stack is cooled by a pre-set amount by appropriate signaling to the balance-of-plant system elements responsible for temperature control (e.g. the first and second heat exchangers 38, 22, coolant systems, etc.). The method then proceeds to step 3-7, in which a pre-set delay $D_1$ is enforced before the sensors are again polled at step 3-2.

At step 3-8, it is determined whether or not the current drawn by the electrolyzer cell stack is below a second current threshold $I_2$. In some embodiments, comparing the current draw to the second current threshold $I_2$ (as is done here at step 3-8) is done to determine whether or not the current draw is below a desired level at which reaction rates within the electrolzyer cell module are optimized for a specific corresponding voltage level. Typically, the second current threshold $I_2$ is substantially smaller than the first current threshold $I_1$. If the current drawn is below the second current threshold $I_2$ (yes path, step 3-8), then the method proceeds to step 3-10. On the other hand, if the current drawn is above the second current threshold $I_2$ (no path, step 3-8) then the method proceeds to step 3-9, in which the temperature is reset maintained at its current value before repeating steps 3-7 and 3-2 as described above.

At step 3-10, it is determined whether or not the temperature of the electrolyzer cell stack is above a second temperature threshold $T_2$. In some embodiments, comparing the temperature of the electrolyzer cell stack to the second temperature threshold $T_2$ (as is done here at step 3-10) is done to determine whether or not the temperature is below a high level, which may indicate a suggested maximum operating temperature for the electrolyzer cell stack. Typically, the second temperature threshold $T_2$ is substantially smaller than the first temperature threshold $T_1$. If the temperature is above the second temperature threshold $T_2$ (yes path, step 3-10), then the method proceeds to step 3-12 in which a temperature warning is provided. On the other hand, if the temperature is below the second temperature threshold $T_2$ (no path, step 3-10), then the method proceeds to step 3-11. At step 3-11, the temperature of the electrolyzer cell stack is raised by a pre-set amount before repeating steps 3-7 and 3-2 as described above. In normal operating conditions the temperature of the electrolyzer cell stack is controlled by appropriate signaling to the balance-of-plant system elements responsible for temperature control (e.g. the first and second heat exchangers 38, 22, coolant systems, etc.).

After the temperature warning is provided at step 3-12, at step 3-13, it is determined whether or not the temperature is above the first temperature threshold $T_1$. If the temperature is not above the first temperature threshold $T_1$ (no path, step 3-13), then steps 3-6, 3-7 and 3-2 are repeated as described above. On the other hand, if the temperature is above the first temperature threshold $T_1$ (yes path, step 3-13), then the method proceeds to step 3-14 in which an emergency stop procedure for the electrolyzer cell module is initiated.

Referring now to FIG. 4, a second example method starts at step 4-1, after which sensors (e.g. current sensor 15, voltage sensor 14 and first and second temperature sensors 36, 31) are polled at step 4-2.

Subsequently, at step 4-3, it is determined whether or not the temperature of the electrolyzer cell stack is above a first temperature threshold $T_1$. If the temperature is above the first temperature threshold $T_1$ (yes path, step 4-3), then the method proceeds to step 4-4 in which an emergency stop procedure for the electrolyzer cell module is initiated. On the other hand, if the temperature is below the first temperature threshold $T_1$ (no path, step 4-3), then the method proceeds to step 4-5.

At step 4-5, it is determined whether or not the current drawn by the electrolyzer cell stack is above a first current threshold $I_1$. If the current drawn is below the first current threshold $I_1$ (no path, step 4-5), then the method proceeds to step 4-8. On the other hand, if the current drawn is above the first current threshold $I_1$ (yes path, step 4-5) then the method proceeds to step 4-6 in which the electrolyzer cell stack is cooled by a pre-set amount. The method then proceeds to step 4-7, in which a pre-set delay $D_1$ is enforced before the sensors are again polled at step 4-2.

At step 4-8, it is determined whether or not the current drawn by the electrolyzer cell stack is below a second current threshold $I_2$. If the current drawn is below the second current threshold $I_2$ (yes path, step 4-8), then the method proceeds to step 4-9. On the other hand, if the current drawn is above the second current threshold $I_2$ (no path, step 4-8) then the method proceeds back to repeat steps 4-7 and 4-2 as described above.

At step 4-9, it is determined whether or not the temperature of the electrolyzer cell stack is above a second temperature threshold $T_2$. If the temperature is above the second temperature threshold $T_2$ (yes path, step 4-9) then the method proceeds to step 4-10 in which a temperature warning is provided. On the other hand, if the temperature is below the second temperature threshold $T_2$ (no path, step 4-9), then the method proceeds to step 4-11. At step 4-11, the temperature of the electrolyzer cell stack is raised by a pre-set amount before repeating steps 4-7 and 4-2 as described above.

While the above description provides examples according to aspects of embodiments of the invention, it will be appreciated that the present invention is susceptible to modification and change without departing from the fair meaning and scope of the accompanying claims. Accordingly, what has been described is merely illustrative of the application of some aspects of embodiments of the invention. It is therefore to be understood that within the scope of the appended claims, the invention may be practiced otherwise than as specifically described herein.

We claim:

1. A balance-of-plant system, suited for regulating the operating temperature of an electrolyzer cell stack having at least one electrolyzer cell, comprising:
   a controller having a computer program readable code means for changing the operating temperature of the electrolyzer cell stack as a result of a current draw measurement, the computer program readable code means including:
   instructions for monitoring the operating temperature;
   instructions for monitoring the current draw associated with the electrolyzer cell stack; and
   instructions for changing the operating temperature of the electrolyzer cell stack as a result of the current draw measurement.

2. A balance-of-plant system according to claim 1, wherein the instructions for changing the operating temperature of the electrolyzer cell stack as a result of the current draw measurement further comprises:
   instructions for determining whether or not the current operating temperature is above a first threshold; and
   instructions for initiating an emergency shut-down procedure if the current operating temperature is above the first threshold.

3. A balance-of-plant system according to claim 1, wherein the instructions for changing the operating temperature of the electrolyzer cell stack as a result of the current draw measurement further comprises:
   instructions for determining whether or not the current operating temperature is above a first threshold;
   instructions for providing a warning signal if the current operating temperature is above the first threshold; and,
   instructions for raising the operating temperature by a pre-set amount if the current operating temperature is below the first threshold.

4. A balance of plant system according to claim 3, wherein the instructions for raising the temperature include instructions for signaling balance-of-plant elements to increase the temperature by the pre-set amount.

5. A balance-of-plant system according to claim 3, wherein the instructions for changing the operating temperature of the electrolyzer cell stack as a result of the current draw measurement further comprises instructions for lowering the operating temperature if the current operating temperature is above the first threshold.

6. A balance of plant system according to claim 5, wherein the instructions for lowering the temperature include instructions for signaling balance-of-plant elements to decrease the temperature.

7. A balance-of-plant system according to claim 3, wherein the instructions for changing the operating temperature of the electrolyzer cell stack as a result of the current draw measurement further comprises:

instructions for determining whether or not the current operating temperature is above a second threshold; and,
instructions for initiating an emergency shut-down procedure if the current operating temperature is above the second threshold.

8. A balance-of-plant system according to claim 1, wherein the computer program readable code means further comprises:
instructions for determining whether or not the current draw is above a first threshold; and,
instructions for lowering the operating temperature if the current draw is above the first threshold.

9. A balance-of-plant system according to claim 1, wherein the computer program readable code means further comprises:
instructions for determining whether or not the current draw is below a first threshold; and,
instructions for raising the operating temperature if the current draw is below the first threshold.

10. A balance-of-plant system according to claim 9, wherein the computer program readable code means further comprises:
instructions for determining whether or not the current draw is above a second threshold; and,
instructions for lowering the operating temperature if the current draw is above the second threshold.

11. A balance-of-plant system according to claim 9, wherein the computer program readable code means further comprises:
instructions for determining whether or not the operating temperature is above a second threshold; and
instructions for providing a warning signal if the current operating temperature is above the second threshold; and,
instructions for raising the operating temperature by a pre-set amount if the current operating temperature is below the second threshold.

12. A balance-of-plant system according to claim 11, wherein the instructions for changing the operating temperature of the electrolyzer cell stack as a result of the current draw measurement further comprises instructions for lowering the operating temperature if the current operating temperature is above the second threshold.

13. A balance-of-plant system according to claim 11, wherein the instructions for changing the operating temperature of the electrolyzer cell stack as a result of the current draw measurement further comprises:
instructions for determining whether or not the current operating temperature is above a third threshold; and,
instructions for initiating an emergency shut-down procedure if the current operating temperature is above the third threshold.

14. A balance-of-plant system according to claim 1, wherein the controller is comprised of at least one of a centralized control system and a distributed control system.

15. An electrolyzer cell stack module comprising a controller for changing the operating temperature of the electrolyzer cell stack as the stack ages to compensate for degradation of the components of the electrolyzer cell stack, wherein as the current draw decreases for a fixed voltage, the operating temperature increases, and the controller has instructions for:
determining by how much a current draw has decreased below a first level as a result of component degradation;
calculating a temperature increase that will increase the current draw back to the first level; and
signaling balance-of-plant elements to increase the temperature as calculated.

16. A method of regulating the operating temperature of an electrolyzer cell stack having at least one electrolyzer cell, comprising:
monitoring the operating temperature;
monitoring the current draw associated with the electrolyzer cell stack; and,
changing the operating temperature of the electrolyzer cell stack as a result of current draw measurements.

17. A method according to claim 16 further comprising:
determining whether or not the current operating temperature is above a first threshold;
providing a warning signal if the current operating temperature is above the first threshold; and,
raising the operating temperature by a pre-set amount if the current operating temperature is below the first threshold.

18. A method according to claim 17 further comprising:
lowering the operating temperature if the current operating temperature is above the first threshold.

19. A method according to claim 17 further comprising:
determining whether or not the current operating temperature is above a second threshold; and,
initiating an emergency shut-down procedure if the current operating temperature is above the second threshold.

20. A method according to claim 16 further comprising:
determining whether or not the current draw is below a first threshold; and,
raising the operating temperature if the current draw is below the first threshold.

21. A method according to claim 20 further comprising:
determining whether or not the operating temperature is above a second threshold;
providing a warning signal if the current operating temperature is above the second threshold; and,
raising the operating temperature by a pre-set amount if the current operating temperature is below the second threshold.

22. A method according to claim 21 further comprising:
lowering the operating temperature if the current operating temperature is above the second threshold.

23. A method according to claim 21 further comprising:
determining whether or not the current operating temperature is above a third threshold; and,
initiating an emergency shut-down procedure if the current operating temperature is above the third threshold.

* * * * *